United States Patent
Matsuno

(10) Patent No.: US 11,727,379 B2
(45) Date of Patent: Aug. 15, 2023

(54) STOCKING SUPPORT SYSTEM AND STOCKING SUPPORT METHOD

(71) Applicant: TOSHIBA TEC KABUSHIKI KAISHA, Tokyo (JP)

(72) Inventor: Hirokazu Matsuno, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 129 days.

(21) Appl. No.: 17/349,357

(22) Filed: Jun. 16, 2021

(65) Prior Publication Data

US 2021/0406858 A1    Dec. 30, 2021

(30) Foreign Application Priority Data

Jun. 25, 2020  (JP) ................. 2020-109852

(51) Int. Cl.
  *G06Q 20/20*   (2012.01)
  *G06Q 10/087*  (2023.01)
  *G07G 1/01*    (2006.01)

(52) U.S. Cl.
  CPC ......... *G06Q 20/203* (2013.01); *G06Q 10/087* (2013.01); *G06Q 20/208* (2013.01); *G06Q 20/209* (2013.01); *G07G 1/01* (2013.01)

(58) Field of Classification Search
  CPC .. G06Q 10/087; G06Q 20/203; G06Q 20/208; G06Q 20/209

USPC .............................................. 235/385; 705/28
See application file for complete search history.

(56) References Cited

U.S. PATENT DOCUMENTS

| | | | |
|---|---|---|---|
| 10,482,444 B2 | 11/2019 | Okamoto | |
| 2004/0073489 A1* | 4/2004 | Varatharajah | G06Q 20/20 705/16 |
| 2008/0149710 A1 | 6/2008 | Silverbrook et al. | |
| 2021/0225134 A1* | 7/2021 | Mori | G06K 19/0723 |

FOREIGN PATENT DOCUMENTS

| | | |
|---|---|---|
| JP | H0652191 A | 2/1994 |
| JP | 2002189786 A | 7/2002 |
| JP | 2018136673 A | 8/2018 |

OTHER PUBLICATIONS

Extended European Search Report dated Sep. 15, 2021, mailed in counterpart European Application No. 21177498.9, 9 pages.

* cited by examiner

*Primary Examiner* — Suezu Ellis
(74) *Attorney, Agent, or Firm* — Kim & Stewart LLP

(57) ABSTRACT

According to one embodiment, a stocking support system includes a processor configured to acquire a reference display value and a lower limit display value for an item. The processor then acquires a sales number for the item from a sales data processing device and calculates a restocking number for the item when a displayed number of the item falls below the lower limit display value. The processor then instructs a printing device to output the calculated restocking number for the item along with information for identifying the item in a work unit for an item restocking process.

16 Claims, 4 Drawing Sheets

STOCKING SUPPORT SYSTEM AND STOCKING SUPPORT METHOD

CROSS-REFERENCE TO RELATED APPLICATION

This application is based upon and claims the benefit of priority from Japanese Patent Application No. 2020-109852, filed on Jun. 25, 2020, the entire contents of which are incorporated herein by reference.

FIELD

Embodiments described herein relate generally to a stocking support system and a stocking support method.

BACKGROUND

It is typically desirable that a display shelf in a store be maintained with an appropriate number of items displayed thereon, but, in some instances, replenishment of removed items may not be timely performed because there is a delay in the confirmation of the number of items being presently displayed.

A technology is known that recommends execution of replenishment in response to sales trends and customer visits (for example, JP-A-2018-136673). However, this technology does not allow a sales clerk to directly recognize a decrease in the number of commodities on the display shelf and permit the sales clerk to appropriately perform restocking.

DETAILED DESCRIPTION

An object to be solved by an embodiment is to enable support for replenishing a commodity in response to a decrease in the number of commodities on a display shelf.

In general, according to one embodiment, a stocking support system includes a processor configured to: acquire a reference display value and a lower limit display value for an item; acquire a sales number for the item from a sales data processing device; calculate a restocking number for the item when a displayed number of the item falls below the lower limit display value based upon an estimate based on the reference display value, the lower limit display value, and the sales number for the item; and instruct a printing device to output the calculated restocking number for the item along with information for identifying the item.

Figure 1:
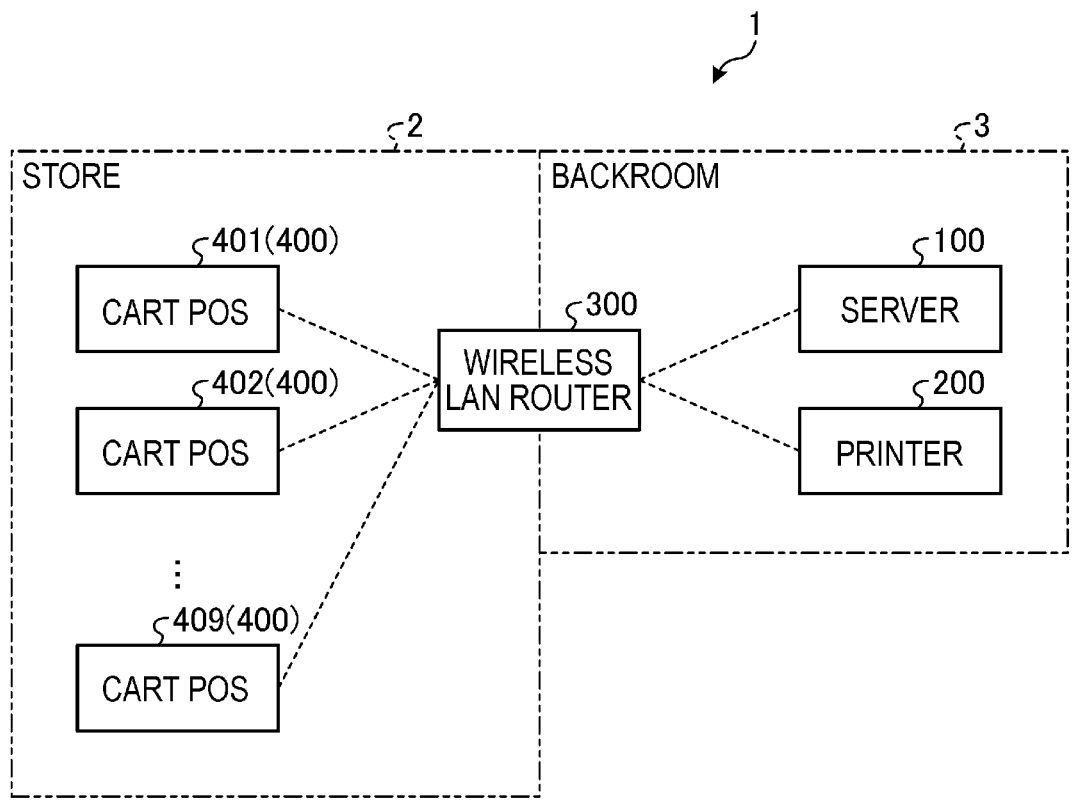
FIG. 1 is a block diagram schematically illustrating a configuration of a stocking support system of an embodiment.

An example embodiment will be described with reference to the drawings. FIG. 1 is a block diagram schematically illustrating a configuration of a stocking support system 1 of this embodiment. The stocking support system 1 includes a server 100, a printer 200, a wireless LAN router 300, and a cart POS 400 (in this context, "POS" is a point-of-sale terminal). The cart POS 400 is used by a shopper to carry a commodity about a retail store. In general, a plurality of carts POS 400 are provided in a store 2. The server 100 and the printer 200 are installed in a backroom 3. The wireless LAN router 300 mediates communication between the cart POS 400 and the server 100, and communication between the server 100 and the printer 200.

The cart POS 400 is formed by attaching a POS terminal device (which is an example of a sales data processing device) that can be used for sales registrations of a commodity to a cart. In general, the cart is a basket provided with wheels or the like. In this context, a basket of a cart is one example of a container that can be used by the shopper to carry the commodities around the store 2.

The POS terminal device attached to the cart includes a commodity information reading unit (e.g., a barcode reader or the like) for acquiring information for identifying the commodity being registered in the sales registration transaction. The commodity information reading unit obtains information (a commodity code, etc.) that identifies the commodity being registered by reading a barcode, for example, attached to the commodity. The POS terminal device identifies the commodity by the information obtained by the commodity information reading unit, and then stores information for the specified commodity in a predetermined storage unit as a commodity to be purchased in the sales registration transaction.

The shopper picks up a commodity from a display location while pushing the cart POS 400 about the store 2, performs sales registration of the selected commodity at the cart POS 400, and then places the now registered commodity in the basket of the cart POS 400. The POS terminal device attached to the cart POS 400 transmits information for the registered commodity to the server 100 via the wireless LAN router 300.

The server 100 updates the displayed number of commodity (the number individual instances of the corresponding commodity type on the display shelf or at the display location) at the store 2 and also the stock number for the commodity in the backroom 3. The displayed number for the commodity is calculated, for example, based on a reference value set for the number of commodities to be displayed as an initial value, subtracting a sales registration amount for the commodity (number sold), and adding a replenishment amount (number restocked) thereof. The stock number is calculated, for example, by subtracting the replenishment amount from the initial value for the total stock number in the backroom.

Figure 2:
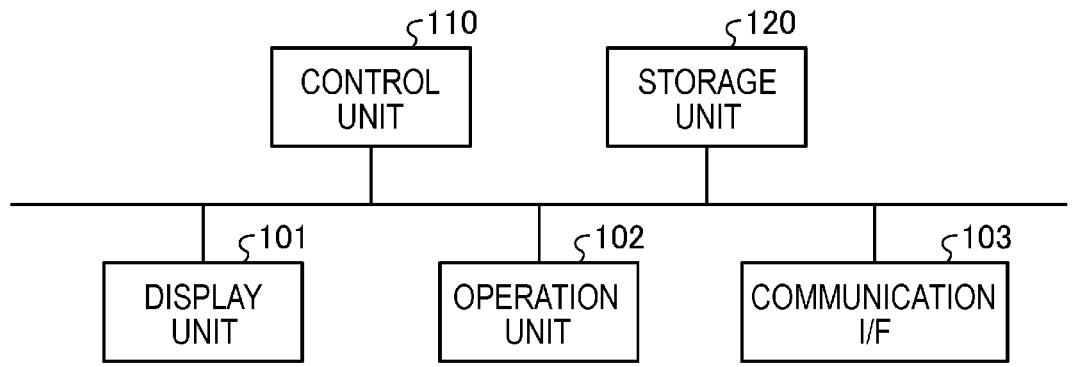
FIG. 2 is a block diagram illustrating a configuration of a server.

FIG. 2 is a block diagram illustrating a configuration of the server 100. The server 100 is configured in the same manner as that of a general-purpose personal computer (PC), and includes a control unit 110, a storage unit 120, a display unit 101, an operation unit 102, and a communication interface (I/F) 103.

The display unit 101 includes a display device such as a liquid crystal display, and displays information for an operator. The operation unit 102 is, for example, a keyboard and a mouse, and receives an input operation from the operator. The communication I/F 103 performs wireless communication with the wireless LAN router 300.

The control unit 110 is, for example, a microcomputer including a central processing unit (CPU), a read only memory (ROM), and a random access memory (RAM). The CPU executes various calculation processes and controls various functions of the server 100. The ROM stores various programs and data executed by the CPU. The RAM temporarily stores various programs and stores various data in a rewritable manner.

The storage unit 120 is, for example, a storage device such as a hard disk drive (HDD) and a solid-state drive (SSD). The storage unit 120 stores a setting value on a per commodity item basis such as a display location, a reference value which is a reference for the number of commodities to be displayed, and a lower limit value which is a number that triggers replenishment execution in correlation with the commodity information (a commodity code, a commodity name, and price).

The storage unit 120 stores a current value such as the stock number, the number of sales, the displayed number, and the stocking number (replenishment number) on a per commodity item basis. The stock number is the number of the commodities in the backroom 3. The number of sales (number sold) is the number of commodities whose sales registration has been completed. The displayed number is the number of commodities presently on display, that is, the number of the commodities existing in the store 2 at the display location or the like. The stocking number is the number of commodities to be replenished. In general, the stocking number is presented together with an identification of a target commodity with a stocking (replenishment) instruction.

Figure 3:
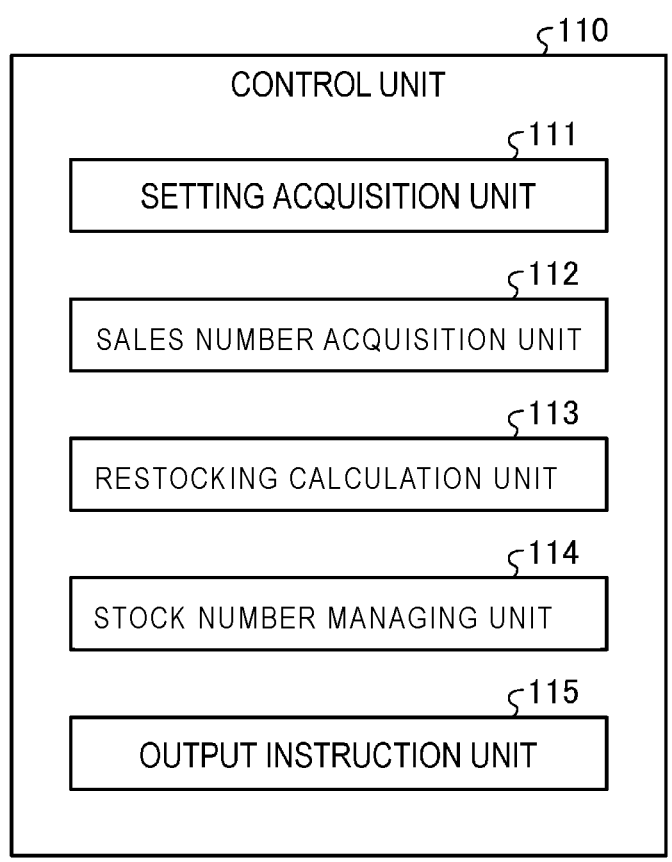
FIG. 3 is a block diagram of a control unit.

FIG. 3 is a block diagram of the control unit 110. Conceptually, the control unit 110 realizes various function units such as a setting acquisition unit 111, a sales number acquisition unit 112, a stocking number calculation unit 113, a stock number managing unit 114, and an output instruction unit 115) by the CPU executing a control program stored in the ROM or the like.

The setting acquisition unit 111 acquires various settings such as the reference value and the lower limit value from the storage unit 120. The sales number acquisition unit 112 acquires the number of sales, which is the number of commodities whose sales registration has been completed within some predetermined period of time, from the POS terminal device attached to the cart POS 400. More specifically, when receiving information of the commodities whose sales registration has been completed from the POS terminal device, the sales number acquisition unit 112 counts the number of sales registrations of the commodities based upon the information, and adds the counted number thereof to the number of sales. An alternative is to directly detect the number of commodities sold or still stocked by measuring the weight of commodities on the display shelf or the like.

When it is estimated that the number of commodities on display (the number of displayed items of a particular commodity type) falls below the lower limit value based upon the reference value, the lower limit value, and the number of sales, the stocking number calculation unit 113 calculates the stocking number (which is the number of commodities to be replenished/restocked from the backroom 3). More specifically, for example, the number of items on display is calculated based upon the reference value and the number of sales. This calculated number is compared with the lower limit value, and when the number of items on displays falls below the lower limit value, the stocking number is determined based upon the number of sales.

The stock number managing unit 114 updates a current value of each variable based upon the stocking numbers determined by the stocking number calculation unit 113. That is, the stock number managing unit 114 updates the stock number by subtracting the stocking numbers (replenished amount) from the stock number for the commodity that has been previously stored in the storage unit 120.

After the stock number is updated by the stock number managing unit 114, the control unit 110 updates the display number by adding the stocking number to the previous display number.

The output instruction unit 115 instructs the printer 200 to print a sheet or the like with the information for identifying the commodity to be restocked and the stocking number (replenishment number) for the commodity to be restocked.

The printer 200 is an example of a printing device. This example, the printer 200 executes a printing on a roll of paper in response to an instruction from the output instruction unit 115. The printer 200 cuts the paper in a width direction of the roll after printing in response to the instruction from the output instruction unit 115 is completed. The cutting can be selectively executed for a full cut and a partial cut in response to the instruction of the output indication unit 115. The full cut is a method for completely separating the sheet, and the partial cut is a method for only cutting a portion of a sheet (for example, a central part in the width direction might be left uncut).

When a plurality of different commodity types are to be replenished and there is a known correlation for improving efficiency of replenishment work by performing restocking of certain commodity types together, the output instruction unit 115 instructs the printer 200 to print restocking instructions for such commodities together as the same work unit (e.g., a same job or restocking task) to be performed together. Cutting in the printer 200 is also performed for each work unit.

Figure 4:
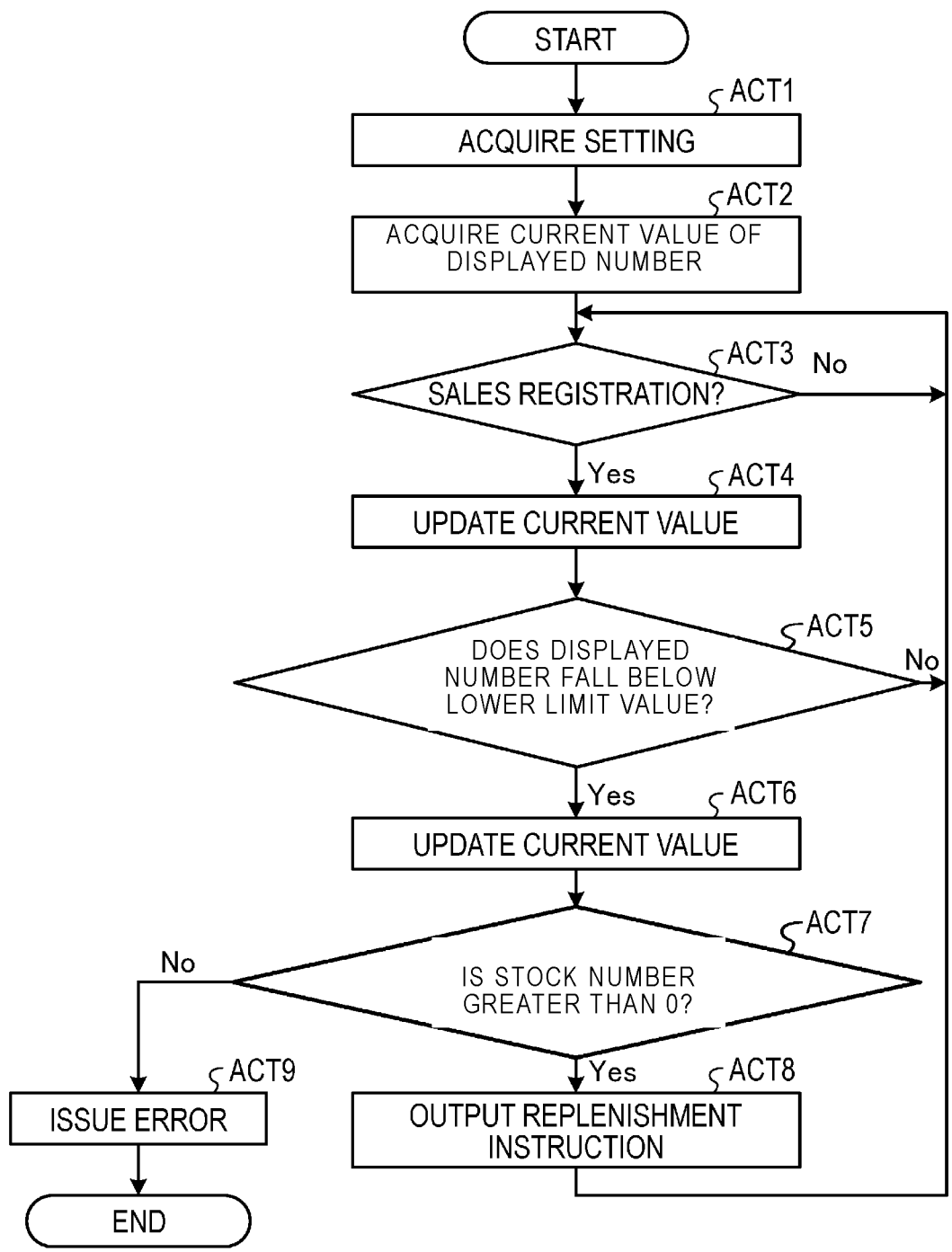
FIG. 4 is a flowchart of a stocking support process executed by a control unit of a server.

FIG. 4 is a flowchart illustrating a stocking support process executed by the control unit 110 of the server 100. The control unit 110 (more particularly in this example, the setting acquisition unit 111) reads various settings such as the commodity code, the commodity name, the display location, the reference value, and the lower limit value of each commodity from the storage unit 120 (ACT 1). Next, the control unit 110 acquires various current values such as the stock number, the sales number, the display number, and the stocking number on a per commodity item basis from the storage unit 120 (ACT 2). In ACT 2, when there is no current value for the display number, the reference value is substituted.

Next, the control unit 110 (more particularly in this example, the sales number acquisition unit 112) waits until the transmission of sales registration information from the POS terminal device attached to the cart POS 400 (No in ACT 3). Once the sales registration information is received (Yes in ACT 3), the control unit 110 updates the sales number based upon the information acquired from the POS terminal device attached to the cart POS 400 (ACT 4).

For example, when information indicating that the sales registration of two pieces of a certain commodity A has been completed is acquired from the POS terminal device, the control unit 110 adds two to the sales number for the commodity A, thereby obtaining the new number of sales. In ACT 4, the control unit 110 of the embodiment further updates the number of displays as well as the number of sales. In this case, the control unit 110 also subtracts two from the display number for the commodity A, thereby obtaining the new display number.

Next, the control unit 110 (more particularly in this example, the stocking number calculation unit 113) determines whether the display number has fallen below the lower limit value (ACT 5), and when the display number has not fallen below the lower limit value (No in ACT 5), the process is returned to ACT 3.

In ACT 5, if the display number has fallen below the lower limit value (Yes in ACT 5), the control unit 110 determines the stocking number based upon the sales number. The stocking number may be equal to the sales number itself, or may be, for example, greater than the sales number.

Next, the control unit 110 (more particularly in this example, the stock number managing unit 114) updates the stock number by subtracting the stocking number from the stored stock number for the commodity in the storage unit 120, updates the display number by adding the stocking number to the display number of displays, and resets the sales number (ACT 6).

The control unit 110 (more particularly in this example, the output instruction unit 115) continuously checks to confirm whether the stock number is greater than or equal to zero (ACT 7). When the stock number is greater than zero (Yes in ACT 7), the control unit 110 outputs a replenishment instruction (ACT 8), and the process is returned to ACT 3. In the embodiment, the replenishment instruction is a printing instruction sent to the printer 200. The control unit 110 instructs the printer 200 to print the stocking number on the recording medium in association with the information (e.g., the commodity name and the commodity code) for identifying the commodity to be restocked. The instruction also includes a cutting instruction for partially cutting the recording medium for each work unit of commodity replenishment.

When the stock number is zero in ACT 7 (No in ACT 7), since the commodity is now out of stock such that replenishment (restocking) cannot be performed, the control unit 110 issues an error and ends this process. A commodity with a stock number of zero can be automatically ordered from a distribution center by the control unit 110. Commodities in the same category and displayed near each other on the display shelves can be ordered by the control unit 110 and arrive on the same shipping pallet or in the same shipping bin so that a salesperson could replenish these commodities at the same time.

Figure 5:
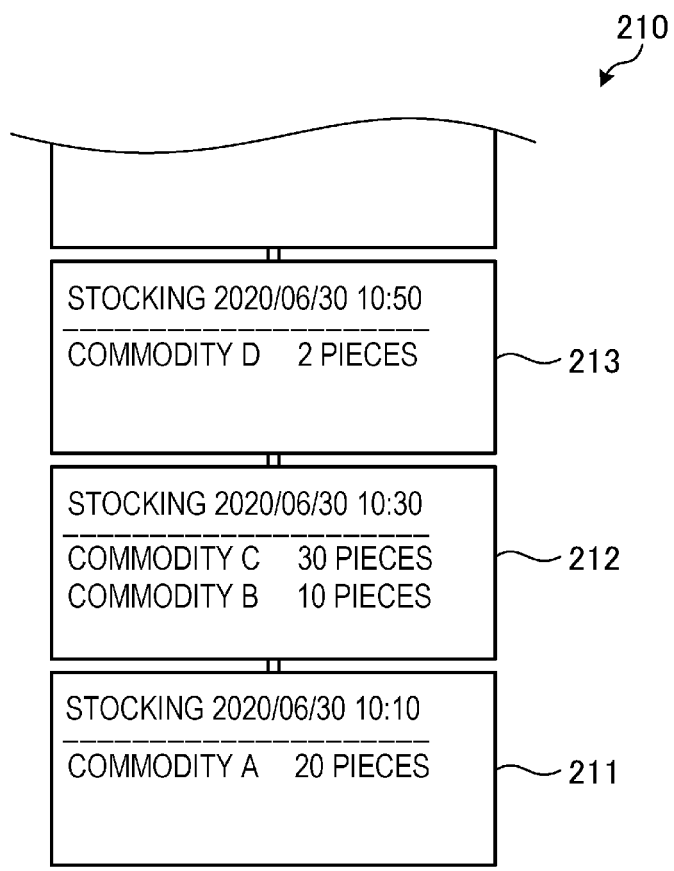
FIG. 5 is a diagram illustrating a stocking instruction sheet which is a recording medium output by a printer.

FIG. 5 is a diagram illustrating a stocking instruction sheet 210 (with individual work unit stocking instruction sheets 211, 212, and 213), which is the recording medium outputted by the printer 200. In this example drawing, a discharging direction of the recording medium is from an upper part to a lower part in the drawing. That is, since the stocking instruction sheet 211 is printed first, the stocking instruction sheet 213 is printed last.

The stocking instruction sheet 210 is divided into different work units for the commodity replenishment operations. This example includes stocking instruction sheets 211, 212, and 213. The respective stocking instruction sheets 211, 212, and 213 are partially cut between each other, and are connected to each other only at a central part in the width direction. Each sales clerk (store employee) engaged in commodity replenishment work tears or cuts off and retains a portion of the stocking instruction sheet 210, and replenishes a commodity described on the stocking instruction sheet 210. In the replenishment work, a fact that the stocking instruction sheet 210 is cut off indicates that the replenishment of the commodity described in the stocking instruction sheet 210 is "in process". A display screen, such as on a smart phone of each clerk, could be used in place of the paper-based stocking instruction sheet 210 depicted in FIG. 5. In such a case, when a sales clerk begins a task on the displayed stocking instruction sheet 210, a button displayed on the stocking instruction sheet 210 would be pressed to indicate the task has been started (is "in process") and other sales clerks could know which tasks remain unperformed.

The work units are set so that the replenishment work can be efficiently performed. For example, in the present embodiment, the replenishment of commodities for which a distance between the display locations thereof is within some predetermined value is treated as part of the same work unit. That is, in the store 2 of the present embodiment, the display locations of the commodity B and the commodity C, which are included together on the stocking instruction sheet 212 are close to each other (a distance therebetween is within a predetermined value).

As another example of the work unit setting, a method based upon the amount of a commodity that one sales clerk can carry, or a method of grouping commodities that are required to be replenished in the near future can be adopted.

Two types of commodities are grouped and printed on the stocking instruction sheet 212, however, in other embodiments the replenishment work may be instructed such that each sheet is always printed and cut for separate, individual commodity types, and a clerk performing the replenishment work may individually determine of his or her own accord to select one or a plurality of stocking instruction sheets 210.

As described above, in the present embodiment, the transition of the display number is monitored by receiving the sales registration information, and the replenishment instruction is outputted at an appropriate timing by comparing the display number to the lower limit value, thereby making it possible to support the commodity replenishment in response to a decrease in the number of commodities on the display shelf.

In the present embodiment, since the display number is updated based upon the sales registration information outputted by the POS terminal device attached to the cart POS 400, a change in the display number can be almost immediately recognized. Therefore, it is possible to shorten the time lag between the requirement for the replenishment occurs and the replenishment instruction is outputted.

As shown in the present embodiment, since the replenishment of the commodities whose display locations are close to each other can be handled as the same work unit, work efficiency can be improved. An experienced sales clerk might be able to perform such a determination of the above-described work unit by himself or herself, however the stocking instruction sheet 212 on which the commodities are grouped in advance and printed is outputted as shown in the embodiment, such that even an inexperienced sales clerk can efficiently perform the replenishment work.

As shown in the embodiment, the stock number is managed as well, thereby making it possible to prevent the occurrence of inconvenience such as outputting the stocking instruction even though a certain commodity is actually out of stock.

In the embodiment, the display number is set as a variable that can be adjusted. In implementation, the display number might be treated as a substantially fixed value in normal store operations, as such when a value equivalent to the display number is required, the value may be calculated each time by subtracting the number of sales (sales number) from the reference value and adding the stocking number.

In the example embodiment, the printing of the recording medium by the printer 200 is performed as the output of the replenishment instruction, however, in other examples, the replenishment instruction may be output by another method, for example, a screen output and/or a voice alarm of a terminal device).

In the embodiment, an example of the sales data processing device is the POS terminal device attached to the cart POS 400, and the basket attached to the cart POS 400 is an example of a container, but the implementation is not limited thereto. In other examples, the sales data processing device and the container may be owned by a shopper himself or herself. As a sales data processing device owned by a shopper, for example, there is a POS terminal device mounted on a shopping basket. As another example of the sales data processing device owned by the shopper, there is a portable terminal device such as a smartphone (in general, it does not matter whether the device is owned by a customer or is rented from a store) in which an application for processing sales data is installed.

In the example embodiment, the printer 200 cuts the sheet grouped and printed for each work unit on the basis of each work unit in response to the instruction of the output instruction unit 115, but the implementation is not limited thereto. For example, the printer 200 may be provided with a pre-perforated sheet roll or the like, and the output instruction unit 115 may output an instruction to the printer 200 to print a content (commodity replenishment information) indicating one work unit to be within a space within a known range of the perforations.

The output instruction unit 115 of the embodiment is only one example, and the implementation is not limited thereto. When there is a predetermined correlation for improving efficiency of the replenishment work between a plurality of commodities to be replenished, the output instruction unit 115 may instruct the printer 200 to output the replenishment of these plurality of commodities as the same work unit when possible. The work unit may be determined so as to improve the efficiency of the replenishment work, and may be different from the embodiment in implementation. An example of a method for determining the work unit by the above-described "predetermined correlation", which is different from the embodiment, can be considered as follows:

(1) Grouping commodities by size or weight that is not difficult to carry at one time (2) Grouping only frozen foods (3) Grouping only commodities that can be carried without using a trolley More specifically about correlation (1), for example, it is considered that lightweight commodities such as a cup noodle and a tissue may be grouped in the same work unit even though the display locations therebetween may not be particularly close to each other. More specifically about correlation (2), when the frozen food is combined with another non-frozen commodity and the frozen food first is taken to a display location of the non-frozen commodity, there is a risk that the frozen food may melt or thaw, such that it may be considered that grouping frozen foods together as the replenishment work unit is desirable.

The server 100 of the stocking support system 1 of the above-described embodiment includes a control device such as a CPU, a storage device such as a read only memory (ROM) and a RAM, an external storage device such as an HDD and a CD drive device, a display device, and an input device such as a keyboard and a mouse. The server 100 thereof has a hardware configuration corresponding to a general-purpose computer.

A stocking support program executed by the stocking support system 1 can be provided as a file in an installable format or an executable format recorded in a non-transitory computer readable recording medium such as a CD-ROM, a flexible disk (FD), a CD-R, or a digital versatile disk (DVD).

The stocking support program executed by the stocking support system 1 may be stored in a computer connected to a network such as the Internet, and may be provided by being downloaded via the network. The stocking support program executed by the stocking support system 1 may be provided or distributed via a network such as the Internet.

The stocking support program may be incorporated into the ROM in advance.

The stocking support program of the present embodiment has a modular configuration providing the above-described respective units (the setting acquisition unit 111, the sales number acquisition unit 112, the stocking number calculation unit 113, the stock number managing unit 114, and the output instruction unit 115). The CPU (processor) loads the respective units into a main storage device by reading and executing the stocking support program from the storage device. As a result, the setting acquisition unit 111, the sales number acquisition unit 112, the stocking number calculation unit 113, the stock number managing unit 114, and the output instruction unit 115 can be considered generated in the main storage device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A stocking support system, comprising:
a processor configured to:
   acquire a reference display value and a lower limit display value for an item;
   acquire a sales number for the item from a sales data processing device;
   calculate a restocking number for the item when a displayed number of the item falls below the lower limit display value based upon an estimate based on the reference display value, the lower limit display value, and the sales number for the item; and
   instruct a printing device to output the calculated restocking number for the item along with information for identifying the item, wherein
the processor instructs the printing device to output the calculated restocking number for the item in conjunction with restocking numbers for other items as a work unit of item replenishment.

2. The stocking support system according to claim 1, wherein
the sales data processing device is a point-of-sale terminal attached to a container used by a shopper to carry items, and
the processor acquires the sales number when sales registration is completed at the point-of-sale terminal.

3. The stocking support system according to claim 1, wherein the work unit of item replenishment is based on a predetermined correlation for improving efficiency of replenishment work between a plurality of items to be replenished.

4. The stocking support system according to claim 1, wherein the processor is further configured to:

update the stock number of the item by subtracting the calculated restocking number of the item from a prior stock number for the item.

5. A stocking support system, comprising:
a cart-based point-of-sale terminal configured to permit a customer to register items in a sales transaction;
an output unit configured to output restocking instructions in work units for sales clerk restocking processes; and
a server configured to:
acquire a reference display value and a lower limit display value for each respective item for sale at a store;
acquire a sales number for an item for sale at the store from the cart-based point-of-sale terminal based on registered items by the customer;
calculate a restocking number for the item when a displayed number for the item falls below the lower limit display value for the item according to an estimate based on the reference display value, the lower limit display value, and the sales number for the item;
instruct the output unit to output the calculated restocking number for the item along with information for identifying the item in a work unit for a sales clerk restocking process; and
update the stock number of the item by subtracting the calculated restocking number of the item from a prior stock number for the item.

6. The stocking support system according to claim 5, wherein the output unit is a printer.

7. The stocking support system according to claim 6, wherein the printer is configured to partially cut a portion of a sheet including a single work unit.

8. The stocking support system according to claim 6, wherein the printer prints on sheet roll.

9. The stocking support system according to claim 5, wherein items are included in a same work unit for the sales clerk restocking process based on a predetermined correlation for improving efficiency of the sales clerk restocking process.

10. The stocking support system according to claim 5, wherein items are included in a same work unit for the sales clerk restocking process based on display location distance between the items for sale at the store.

11. The stocking support system according to claim 5, wherein items are included in a same work unit for the sales clerk restocking process based on item type.

12. The stocking support system according to claim 5, wherein items are included in a same work unit for the sales clerk restocking process based on item weight.

13. A non-transitory computer readable storage medium storing program instructions which when executed by a processor of a server in a stocking support system causes the processor to perform a method comprising:
acquiring a reference display value and a lower limit display value for an item;
acquiring a sales number for the item from a sales data processing device;
calculating a restocking number for the item when a displayed number of the item falls below the lower limit display value based upon an estimate based on the reference display value, the lower limit display value, and the sales number for the item; and
instructing a printing device to output the calculated restocking number for the item along with information for identifying the item, wherein
the processor instructs the printing device to output the calculated restocking number for the item in conjunction with restocking numbers for other items as a work unit of item replenishment.

14. The non-transitory computer readable storage medium according to claim 13, wherein
the sales data processing device is a point-of-sale terminal attached to a container used by a shopper to carry items, and
the method further comprises:
acquiring the sales number when sales registration is completed at the point-of-sale terminal.

15. The non-transitory computer readable storage medium according to claim 13, wherein
the work unit of item replenishment is based on a predetermined correlation for improving efficiency of replenishment work between a plurality of items to be replenished.

16. The non-transitory computer readable storage medium according to claim 13, the method further comprising:
updating the stock number of the item by subtracting the calculated restocking number of the item from a prior stock number for the item.

* * * * *